V. Palen.
Sawing Piles Under Water.
Nº 11,872.  Patented Oct. 31, 1854.
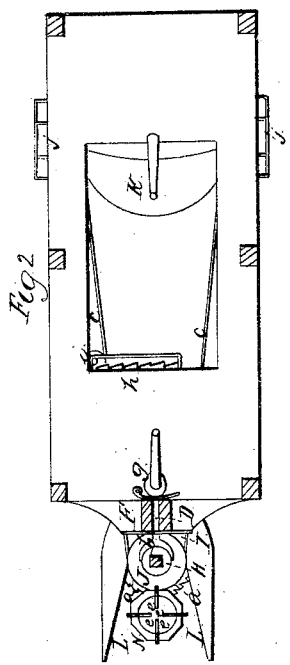
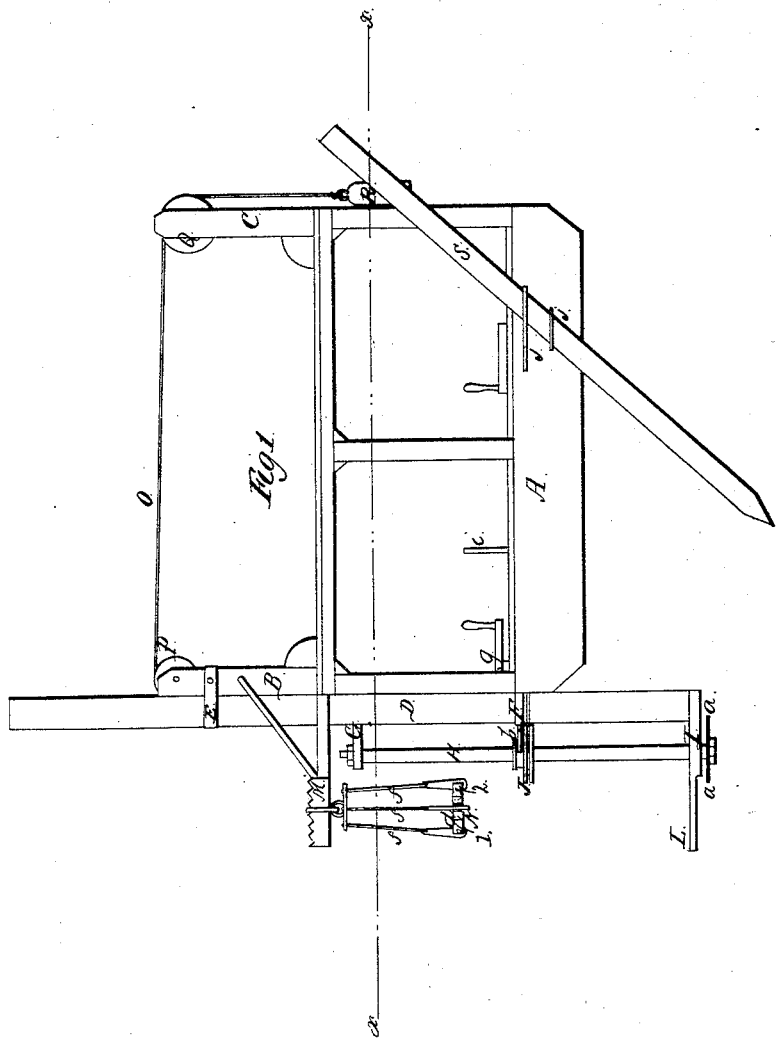

UNITED STATES PATENT OFFICE.

VINCENT PALEN, OF PORTSMOUTH, VIRGINIA.

ARRANGEMENT OF MECHANISM FOR SAWING OFF PILES UNDER WATER.

Specification of Letters Patent No. 11,872, dated October 31, 1854.

*To all whom it may concern:*

Be it known that I, VINCENT PALEN, of Portsmouth, in the county of Norfolk and State of Virginia, have invented certain new and useful Improvements in Machines for Sawing off Piles under Water; and I do hereby declare the following to be a full, clear, and exact description of the same, reference being had to the accompanying drawings, making a part of the same in which—

Figure 1 represents a side view, and Fig. 2, represents a horizontal section taken at the red line $x\ x$ of Fig. 1.

Similar letters in both the figures refer to like parts.

The nature of my invention relates to the arrangement of the guides and saw on the same sliding frame, so that the guides will bring up and steady the saw against the pile to be sawed off, and the saw shaft have a bearing at each of its ends, to prevent the saw from cramping or buckling in its kerf.

Various machines for sawing off piles under water have been essayed, but from some radical defect in their operation have failed. And in some instances, in the construction of docks or coffer dams, the immense labor of drawing the piles had to be resorted to, where if allowed to remain after being sawed off to the proper height, great additional security to the work might have been attained. The principle being therefore well known, I only allege novelty in the arrangement of the parts by which I aid the saw in being guided and held up to its work.

To enable others skilled in the art to make and use my invention, I will proceed to describe the same with reference to the drawings.

The entire apparatus may be arranged on a hull or float A, on which is substantially arranged the two uprights B, C. In the bow of the float is arranged the sliding frame D, supported to the upright B at top by a strap E, passing around it and the upright, and to the hull by the guide piece F. An arm G, projects from said sliding frame, which furnishes a support for the upper end of the saw shaft H, the lower end of said saw shaft being supported in the piece I, in close proximity to the saw $a$, which enables the saw to run in its kerf without cramping. The saw shaft is square, and passes through a similar square hole in the pulley J, said pulley being retained in its vertical position by the forked arm $b$, secured to the hull. The saw shaft and saw may be driven by an endless belt $c$ passing around a pulley or drum K, and around the pulley J, and may be driven by hand or any other power. To the lower end of the sliding frame D, is attached the guides or guide pieces L, which embrace the pile and guide and steady the saw while cutting. On an arm M immediately over the point in which the pile is held in the guides, is hung by block and tackle or other means, a clutch N, which is let down over the head of the pile sufficiently far to clutch said head, when it is drawn back by the block and tackle, and which both aids to hold up the float to the pile, and also to raise up the top of the pile as it is sawed, to give the saw free play in its kerf. The clutch is constructed as follows: $d$ is the clutch head which may be made of segments, or solid, and in said head are placed a series of L shaped dogs, pivoted at the angles 1, 2. When the clutch is lowered over the pile head, the points of the dogs $e\ e$ (in dotted lines in Fig. 2,) raise up and slip over the pile. When the clutch is raised, by the cords or chains $f$, the points take into the pile and firmly hold therein for the purpose before alluded to. The sliding frame has a cord or chain O, attached to it which passes over the pulleys P, Q, and terminates in a weight R, for balancing said frame. When the frame is lowered to the proper place, it is held by an eccentric clamp $g$, bearing against it. $h$ is a rack for holding the pawl $i$, which strains up or loosens the belt $c$, as may be desired. S, is a tug there being one on each side, passing through staples $j$, to aid in holding the float up to the work.

Having thus fully described the nature of my invention I would state that I am aware that a bearing has been used at each end of the saw shaft, and I do not therefore claim this when not combined with the guides, but

What I do claim as new and desire to secure by Letters Patent is—

The combination of the devices for guiding and holding the saw up to the kerf, so as to prevent it from cramping and buckling in its kerf, the same consisting in the arrangement of the guides and saw shaft on the adjustable frame, in the manner and for the purpose set forth.

VINCENT PALEN.

Witnesses:
A. B. STOUGHTON,
SAML. GRUBB.